(12) United States Patent
Musial et al.

(10) Patent No.: US 9,509,759 B2
(45) Date of Patent: Nov. 29, 2016

(54) SERVICE AGREEMENT PERFORMANCE VALIDATION IN A CLOUD HOSTED ENVIRONMENT

(71) Applicant: International Business Machines Corporation, Armonk, NY (US)

(72) Inventors: John G. Musial, Newburgh, NY (US); Sandeep R. Patil, Pune (IN); Riyazahamad M. Shiraguppi, Pune (IN); Gandhi Sivakumar, Victoria (AU); Matthew B. Trevathan, Roswell, GA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/021,592

(22) Filed: Sep. 9, 2013

(65) Prior Publication Data

US 2015/0074174 A1    Mar. 12, 2015

(51) Int. Cl.

| | |
|---|---|
| G06F 15/173 | (2006.01) |
| H04L 29/08 | (2006.01) |
| G06F 9/455 | (2006.01) |
| G06F 21/00 | (2013.01) |
| G06F 11/30 | (2006.01) |
| G06F 21/31 | (2013.01) |
| H04L 12/24 | (2006.01) |

(52) U.S. Cl.
CPC ........... H04L 67/10 (2013.01); G06F 9/45558 (2013.01); G06F 11/3006 (2013.01); G06F 21/00 (2013.01); G06F 21/31 (2013.01); H04L 67/18 (2013.01); *G06F 2221/2111* (2013.01); *H04L 41/5096* (2013.01)

(58) Field of Classification Search
CPC .......... H04L 67/1002; H04L 67/1008; H04L 67/327; H04L 67/322; H04L 41/22
USPC .................................................. 709/203, 224
See application file for complete search history.

(56) References Cited

U.S. PATENT DOCUMENTS

| | | | |
|---|---|---|---|
| 7,411,512 B2 | 8/2008 | Domeier | |
| 7,809,857 B2 | 10/2010 | Anderson et al. | |
| 8,175,863 B1 * | 5/2012 | Ostermeyer et al. | ........... 703/22 |
| 8,499,331 B1 * | 7/2013 | Yehuda | ............... H04L 41/5006 709/223 |
| 2002/0143991 A1 | 10/2002 | Chow et al. | |

(Continued)

OTHER PUBLICATIONS

Peterson, Zachary NJ et al., "A Position Paper on Data Sovereignty: The Importance of Geolocating Data in the Cloud," Proceedings of the 8th USENIX conference on Networked systems design and implementatiom, Jun. 2011, 5 pages.

(Continued)

*Primary Examiner* — Wing F Chan
*Assistant Examiner* — Joseph Maniwang
(74) *Attorney, Agent, or Firm* — Cantor Colburn LLP; Kurt Goudy

(57) ABSTRACT

Service agreement performance validation includes receiving a request for access to an application from a client system. The application is hosted by a data center in a network-hosted computing environment. The service agreement performance validation also includes querying a global positioning system receiver for geographic location information of the data center, receiving the geographic location information from the global positioning system receiver, transmitting the geographic location information to the client system, and providing access to the application.

16 Claims, 10 Drawing Sheets

(56) References Cited

U.S. PATENT DOCUMENTS

| | | | |
|---|---|---|---|
| 2008/0287151 | A1 | 11/2008 | Fjelstad et al. |
| 2009/0070697 | A1* | 3/2009 | LaForest ............... 715/772 |
| 2009/0217333 | A1 | 8/2009 | Young |
| 2009/0276771 | A1* | 11/2009 | Nickolov et al. ........... 717/177 |
| 2010/0131641 | A1* | 5/2010 | Brown et al. ............ 709/224 |
| 2010/0312809 | A1 | 12/2010 | Calder et al. |
| 2010/0322255 | A1 | 12/2010 | Hao et al. |
| 2012/0136697 | A1* | 5/2012 | Peles et al. ............. 705/7.38 |
| 2012/0297016 | A1 | 11/2012 | Iyer et al. |
| 2012/0324259 | A1* | 12/2012 | Aasheim et al. ........... 713/320 |
| 2013/0054780 | A1 | 2/2013 | Bade et al. |
| 2014/0164554 | A1* | 6/2014 | Joshi et al. ............ 709/217 |
| 2014/0351412 | A1* | 11/2014 | Elisha ................ 709/224 |

OTHER PUBLICATIONS

Noman, Ali et al., "DLAS: Data Location Assurance Service for Cloud Computing Environments", 2012 Tenth Annual International Conference on Privacy, Security and Trust (PST), pp. 225-228, IEEE, 2012.

Krishnan, Sriram, "Geo Location Enables Developers to Choose Data Centers and Group Applications & Storage", http://blogs.msdn.com/b/windowsazure/archive/2009/03/18/geo-location-enables-developers-to-choose-data-centers-and-group-applications-storage.aspx, Windows Azure, Mar. 18, 2009, accessed Sep. 9, 2013, 2 pages.

Gondree, Mark et al., "Geolocation of Data in the Cloud," Proceedings of the Third ACM Conference on Data and Application Security and Privacy, pp. 26-36, ACM, 2013.

Albershri, Aiiad Ahmad et al., "Mutual Protection in a Cloud Computing Environment," IEEE 12th International Conference on High Performance Computing and Communications (HPCC 2010), pp. 641-646, IEEE Computer Society, 2010.

Peter Mell and Timothy Grance, The NIST Definition of Cloud Computing (Draft), Special Publication 800-145 (Draft), U.S. Department of Commerce, Jan. 2011, 7 pages.

Shouraboura, Caroline and Bleher, Pavel, "Placement of applications in computing clouds using Voronoi diagrams", The Brazilian Computer Society 2011, published online Sep. 23, 2011, 13 pages.

Albeshri, Aiiad et al., "GeoProof: Proofs of Geographic Location for Cloud Computing Environment," 2012 32nd International Conference on Distributed Computing Systems Workshops (ICDCSW), pp. 506-514, IEEE, 2012.

U.S. Appl. No. 14/051,484; Non-Final Office Action; filed Oct. 11, 2013; Date Mailed: Oct. 8, 2014; 15 pages.

U.S. Appl. No. 14/051,484;Final Office Action, filed Oct. 11, 2013; Date Mailed: Oct. 26, 2015; 10 pages.

* cited by examiner

SERVICE AGREEMENT PERFORMANCE VALIDATION IN A CLOUD HOSTED ENVIRONMENT

BACKGROUND

The present invention relates to network computing, and more specifically, to service agreement performance validation and conformance in a cloud hosted environment.

Network-managed data by service providers has become increasingly popular, as the amount of data utilized by business enterprises, organizations, and even by some individuals has increased. The costs associated with hardware and storage devices, as well as their associated bandwidth requirements have made network-managed solutions more desirable.

Service agreements (also known as service level agreements, or SLAs) between a host provider and a customer typically include terms that specify a quality of service (QoS) that is to be expected for activities conducted within the hosting environment. For example, costs for receiving host services can vary depending on the number of applications hosted, the number of instances of an application running (e.g., for redundancy and load balancing), and the times and site locations of the hosting (e.g., the data center selected for the hosting). While the service agreements spell out these terms, currently there is no way for the host provider to assure the customer that performance under the terms of the agreement is fully satisfied. Likewise, there is no way for the customer to validate compliance by the host provider.

SUMMARY

According to one embodiment of the present invention, a method is provided. The method includes receiving a request for access to an application from a client system. The application is hosted by a data center in a network-hosted computing environment. The method also includes querying a global positioning system receiver for geographic location information of the data center, and receiving the geographic location information from the global positioning system receiver. The method further includes transmitting the geographic location information to the client system, and providing access to the application.

According to another embodiment of the present invention, a system is provided. The system includes a computer processor and logic executable by the computer processor. The logic is configured to implement a method. The method includes receiving a request for access to an application from a client system. The application is hosted by a data center in a network-hosted computing environment. The method also includes querying a global positioning system receiver for geographic location information of the data center, and receiving the geographic location information from the global positioning system receiver. The method further includes transmitting the geographic location information to the client system, and providing access to the application.

According to a further embodiment of the present invention, a computer program product is provided. The computer program product includes a computer-readable storage medium having instructions embodied thereon, which when executed by a computer, causes the computer to implement a method. The method includes receiving a request for access to an application from a client system. The application is hosted by a data center in a network-hosted computing environment. The method also includes querying a global positioning system receiver for geographic location information of the data center, and receiving the geographic location information from the global positioning system receiver. The method further includes transmitting the geographic location information to the client system, and providing access to the application.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
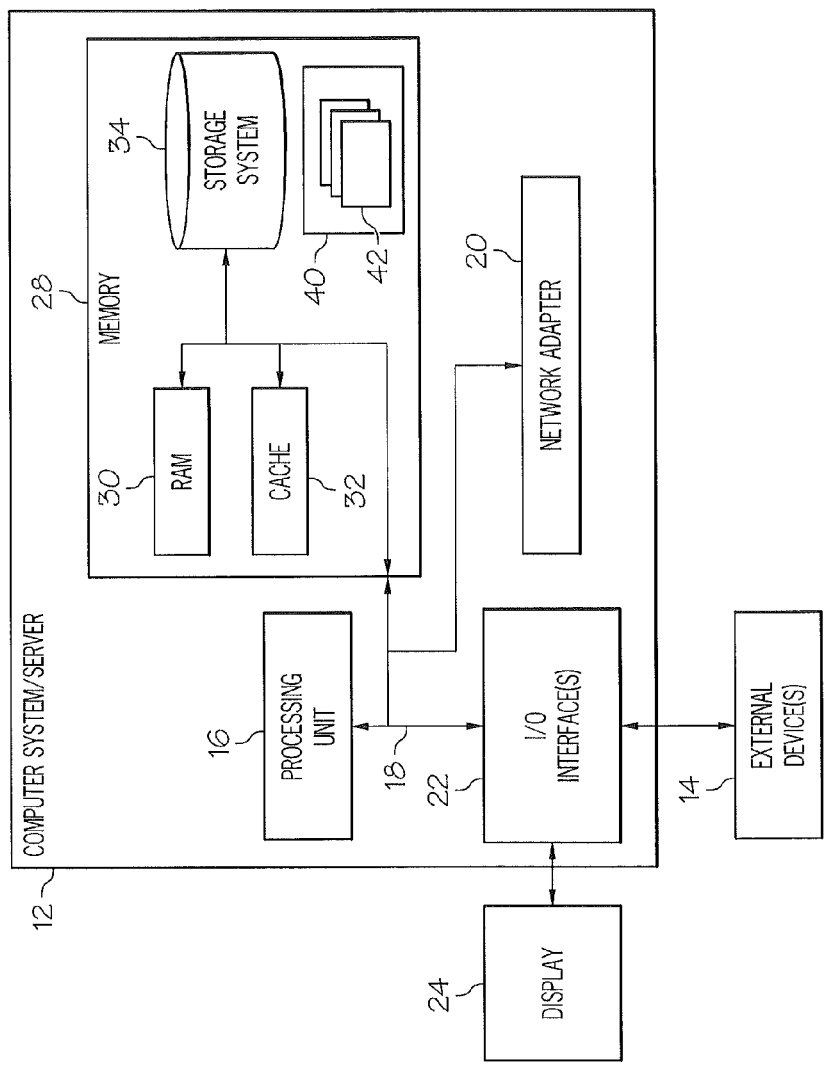
FIG. 1 depicts a cloud computing node according to an embodiment of the present invention.

Exemplary embodiments relate to service agreement performance validation processes (also referred to herein as "performance validation processes") in a network-hosted computing environment, which provide transparency to customers utilizing network-hosted computing services in terms of validating compliance with terms set forth in the customers' service agreements. The performance validation processes likewise provides the ability for network-hosted computing providers to offer assurances to their customers that performance of the network-hosted computing activities is implemented according to the terms of their service agreements. In addition, the performance validation processes provides options for customers to view performance activities, as well as any non-conformances resulting from these activities, and to take any desired actions in response thereto. These and other features of the performance validation processes will now be described.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed (e.g., any client-server model).

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client systems through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
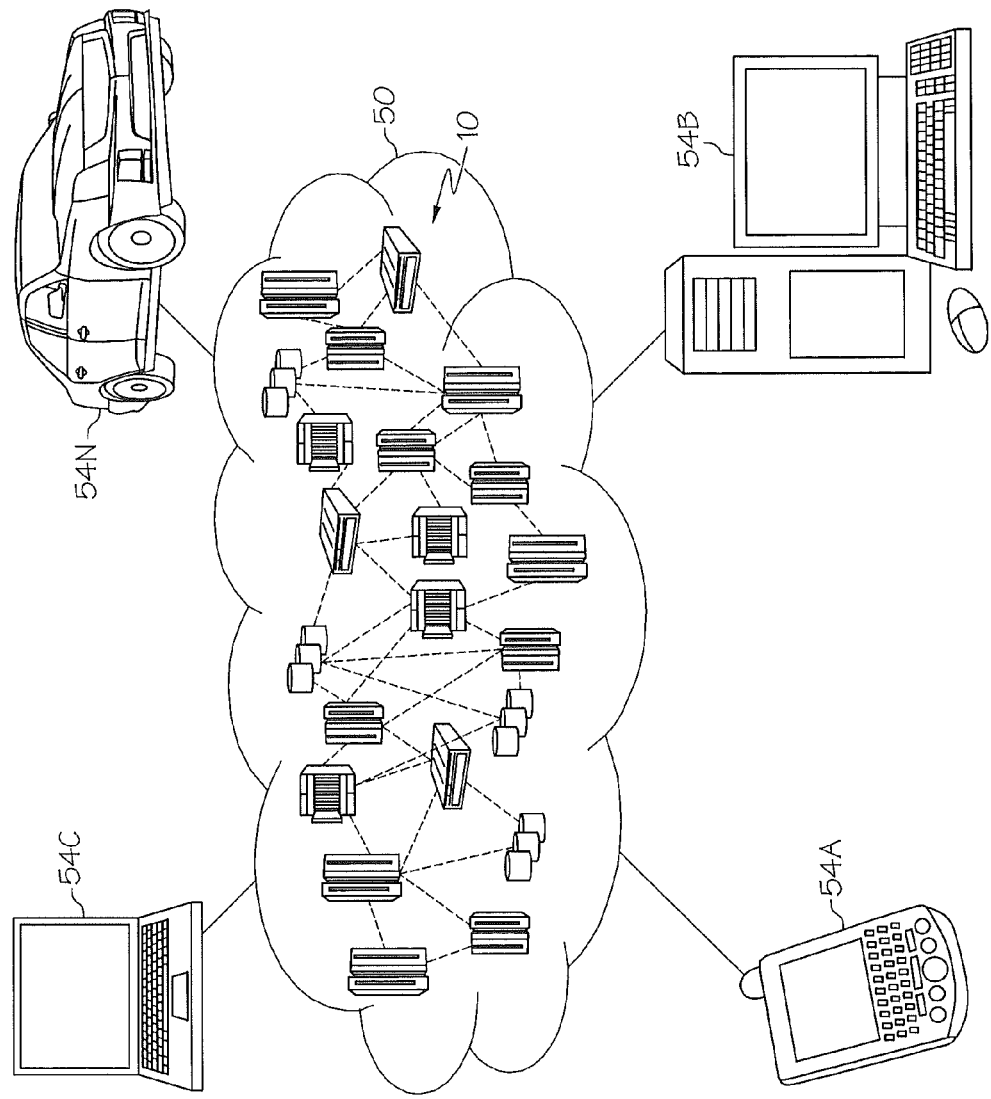
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
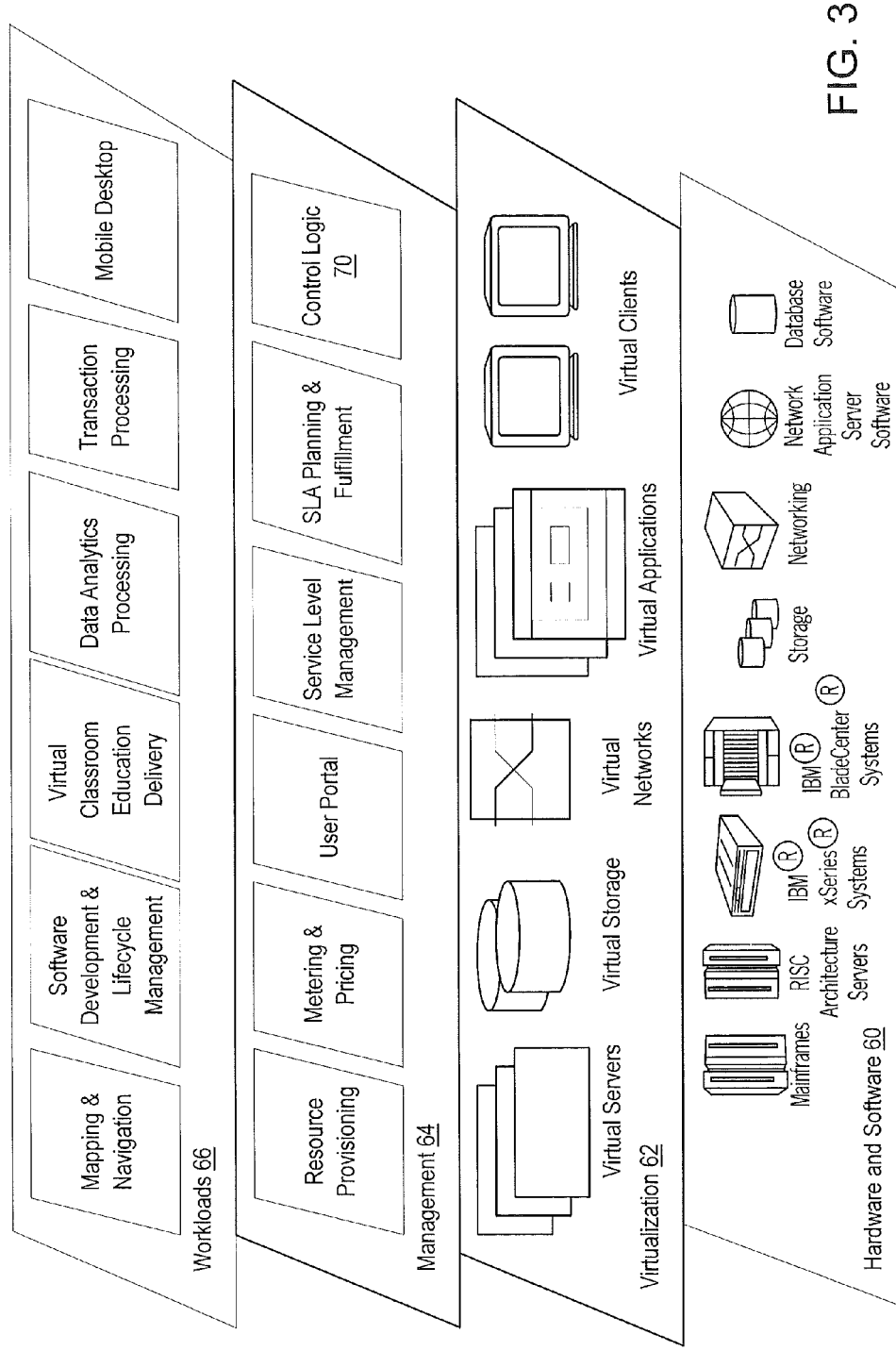
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide)

Virtualization layer 62 provides an abstraction layer from which the following examples of virtual entities may be provided: virtual servers; virtual storage; virtual networks, including virtual private networks; virtual applications and operating systems; and virtual clients.

In one embodiment, one or both of the hardware and software layer 60 and the virtualization layer 62 may include edge components, such as a web server front end and image cache, as well as an image library store, e.g., in a high-performance RAID storage area network (SAN).

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security (not shown) provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA. In one exemplary embodiment, control logic 70 in the management layer 64 implements the exemplary performance validation processes described herein; however, it will be understood that the control logic 70 may be implemented in any layer.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and a mobile desktop for mobile devices (e.g., 54A, 54C, and 54N, as well as mobile nodes 10 in cloud computing environment 50) accessing the cloud computing services.

The control logic 70 includes one or more algorithms to implement embodiments described herein to provide performance validation processes. In an embodiment, the control logic 70 is coupled to and/or resides in the memory 28 shown in FIG. 1. In addition, embodiments of the control logic 70 may include one or more program modules 42 of the program/utility 40 shown in FIG. 1. In a further embodiment, the control logic 70 is part of the management layer 64 and is executed on hardware located in the hardware and software layer 60.

A portion of the exemplary performance validation processes may be implemented by a computer device (e.g., local computing devices 54A-54N of FIG. 2), as a cloud consumer, that is configured to receive location information for one or more data centers from which network-hosted computing services are provided. In addition, a portion of the exemplary performance validation processes services are performed by at least one node (e.g., one or more of the nodes 10 in the cloud computing environment 50 (shown in FIGS. 1 and 2). In one embodiment, the control logic 70 receives the location information from a global positioning system (GPS) residing in a data center. The location information may be received at the data center GPS from a satellite. Other information can be provided to the cloud consumer as well, such as data center identification, application identification, instance identification, etc. An application agent executing on the computer device processes this information and provides a view (e.g., map, chart, table, etc.) of the processed information. These and other aspects of the performance validation processes will now be described with respect to FIGS. 4-10.

Figure 4:
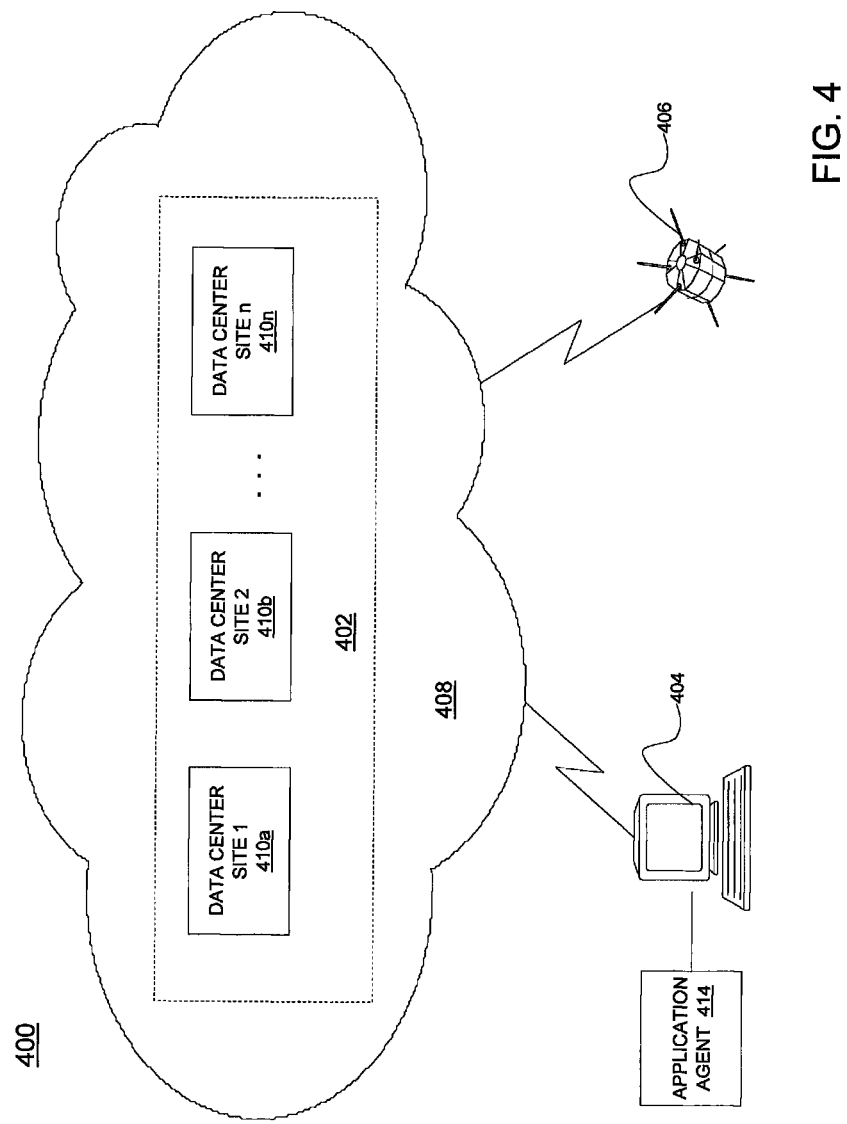
FIG. 4 depicts a block diagram of a system upon which service agreement performance validation for network-hosted services may be implemented according to an embodiment of the present invention.

Turning now to FIG. 4, a system 400 upon which the performance validation processes may be implemented will now be described. The system of FIG. 4 depicts a network-hosted provider system 402 (also referred to herein as "provider system") which, in turn, includes data centers 410a-410n distributed over networks 408, through which the provider system provides network-hosted computing services to consumers (e.g., cloud computing). Each of the data centers 410a-410n may be distributed throughout various wide-spread geographic locations. The data centers 410a-410n may include various computer systems, storage devices, and related resources similar to the nodes 10 described in cloud computing environment 50 (FIG. 2).

Also shown in FIG. 4 are a client system 404 and a satellite 406, both of which are communicatively coupled to the networks 408. The client system 404 represents a cloud consumer or end user of the network-hosted computing services provided by the provider system 402. The client system 404 may be implemented similar to the local computing devices 54 shown in FIG. 2. In an embodiment, the client system 404 executes an application agent 414 to facilitate the performance validation processes described herein.

Figure 5:
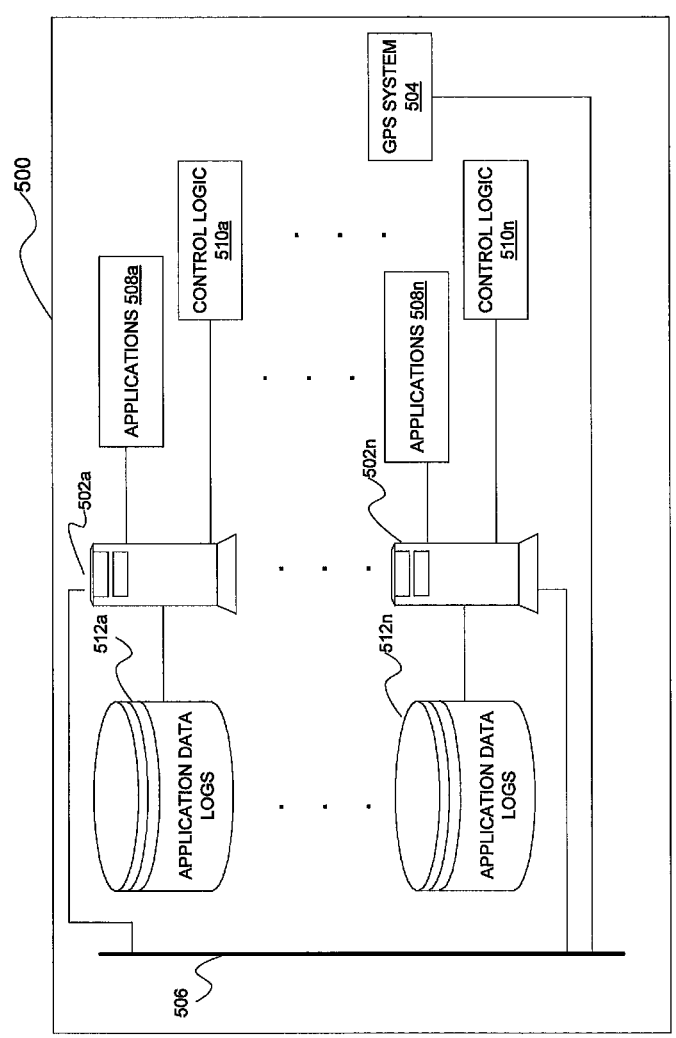
FIG. 5 depicts a block diagram of a sample data center associated with the system of FIG. 4 according to an embodiment of the present invention.

Turning now to FIG. 5, a detailed implementation of a data center 500 will now be described. The data center 500 corresponds to any one of the data centers 410a-401n described in FIG. 4. The data center 500 includes a plurality of computer systems 502a-502n, which may be high-speed computer processors, such as servers or mainframe computers, capable of handling a high volume of computing activities conducted by end users of the network-hosted computing services. The computer systems 502a-502n may each execute a number of applications 508a-508n, respectively, as well as control logic 510a-510n, respectively. The control logic 510a-510n corresponds to the program modules 42 of FIG. 1 and the control logic 70 described in FIG. 3. The control logic 510a-510n implements the exemplary performance validation processes described herein. While the control logic 510a-510n is shown in FIG. 5 as executable by each of the computer systems 502a-502n, it will be understood that a single control logic application may be implemented on one of the computer systems 502a-502n in a supervisory capacity with respect to the remaining computer systems 502a-502n.

The computer systems 502a-502n may be communicatively coupled to respective storage devices 512a-512n, as well as a network bus 506. The storage devices 512a-512n may store application data, service agreements, and logs, as will be described further herein. A GPS system 504 is also coupled to the network bus 506. The GPS system 504 may include a processor, a receiver, and logic for receiving and processing location data received from the satellite 406. The network bus 506 may be any type of network, or combination of networks, known in the art, e.g., local area network, wide area network, intranet, extranet, Internet, etc.

In an embodiment, a cloud consumer, such as client system 404, may access one or more of computer systems 502a-502n of the data center 500, as well as any other data center (e.g., data centers 410a-410n of FIG. 4) depending on the terms of the client's service agreement, and the computer systems at each of the relevant data centers execute corresponding applications (e.g., applications 508a-508n) and storage devices (e.g., storage devices 512a-512n) pursuant to the computing needs of the client system 404. In a cloud computing environment, there may be multiple instances of these applications simultaneously executing across a distributed number of computer systems. The system provides load balancing techniques to ensure high speed processing according to the availability of the various computer systems and related resources. An application instance, as described herein, refers to a virtual machine with specified memory, storage space, and virtual processing cores and units that are defined for a particular platform, such as 32- or 64-bit platform. The network environment may operate via a cloud infrastructure in which the storage of, and access to, data storage is managed by the provider system on behalf of a data owner and/or end user (e.g., client system 404).

As indicated above, a service agreement specifies performance requirements and related information. A customer who is interested in cost savings above other considerations may specify that the lowest cost data centers should be used for the customer's computing services. However, a customer who is more interested in data security than costs, may opt for a data center with higher costs but which has the most trusted encryption and security tools available. Further, that same customer may require that all data be stored in a data center located in the United States for security reasons. Yet another customer may be focused on data integrity and require a certain level of redundancy in storage options in the event of a network disruption. In addition, the preference or desirability of a particular data center may change from one determination to another based on the current capacity or load status of the data center; thus, the list of data centers employed may be 'dynamic.' These and other factors may be employed in establishing a service agreement.

Figure 6:
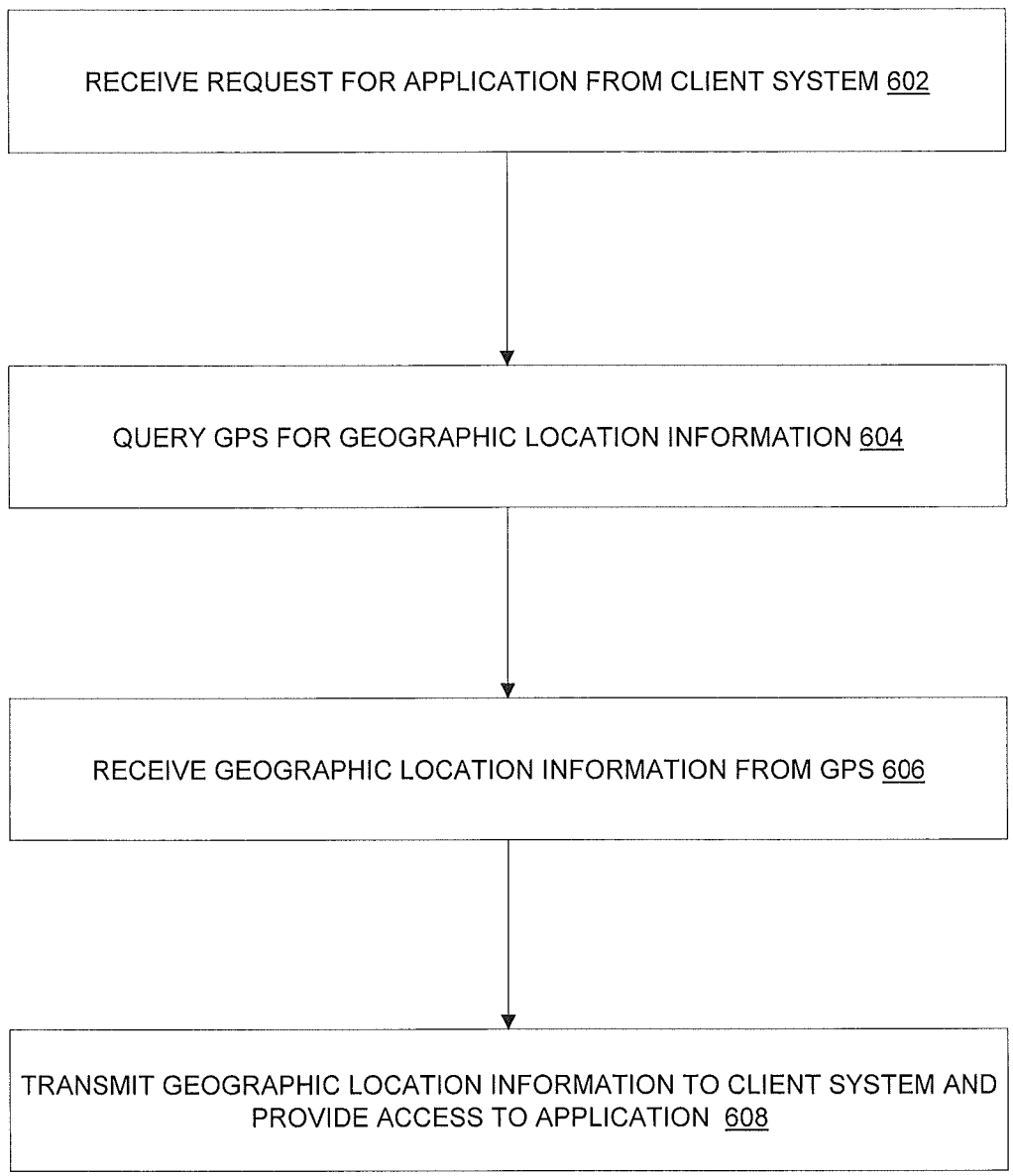
FIG. 6 is a flow diagram of a process for implementing service agreement performance validation for network-hosted services according to an embodiment of the present invention.

The performance validation processes enable network-hosted computing providers to provide transparency to its customers relating to the location and allocation of resources in a cloud computing environment. Turning now to FIG. 6, a flow diagram describing a process for implement the performance validation processes will now be described in an embodiment. It will be assumed for purposes of illustration, that the network-hosted computing services are initiated between the client system 404 and the data center 410a, which in turn corresponds to the data center 500. Further, it is assumed that the communications are conducted at least initially, between the client system 404 and the computing system 502a of the data center 500.

At step 602, the computer system 502a receives a request from the client system 404 to access an application hosted by the provider system 402. At step 604, the control logic 510a queries the GPS system 504 for geographic location information. The geographic location information represents the geographic location (e.g., in longitude and latitude) of the particular data center 410a/500.

At step 606, the control logic 510a receives the geographic location information of the data center 410a/500, and at step 608, the control logic 510a transmits this geographic location information to the client system 404 and provides access to the requested application (e.g., one of applications 508a).

Figure 7:
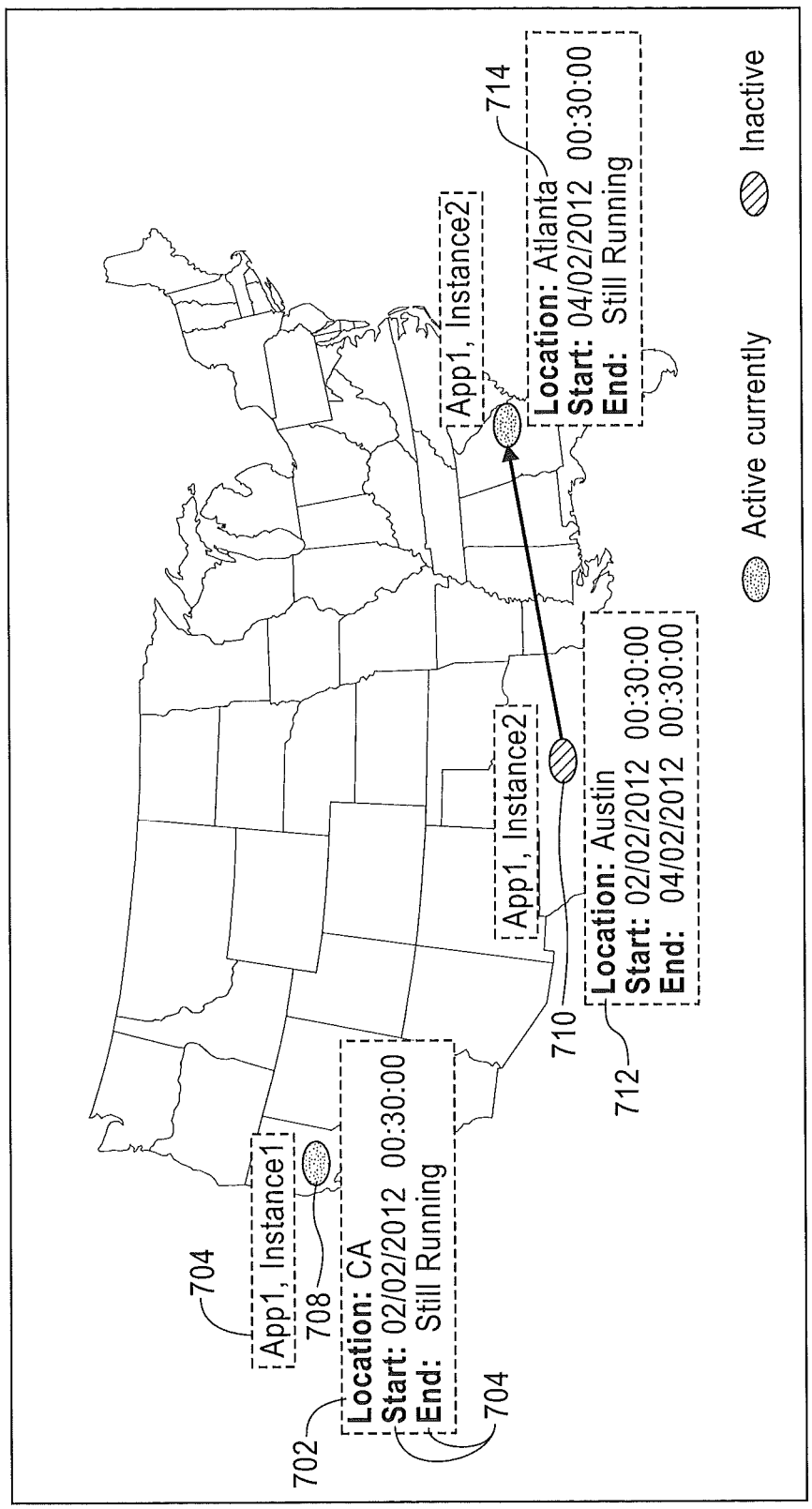
FIG. 7 is a graphical depiction of a location map according to an embodiment of the present invention.

As indicated above, there may be multiple instances of a requested application simultaneously running for a given client system. The performance validation processes are configured to track geographic locations of each of the data centers managed by the network-hosted service provider for the client system and provide this information to the client system. For example, as shown in FIG. 7, a location map is provided to the client system 404 in which there are two currently running instances for an application (App1). The control logic for each of the computer systems for which an instance is running may provide this information to the client system, and the application agent 414 may be configured to populate the location data onto the map. Alternatively, a supervisory control logic program may monitor client system requests to a particular data center and provide this information to the client system.

As shown in FIG. 7, a first instance is running at a data center 702 in California. The control logic provides service activity data 704, such as the application identification and instance, start date and times, as well as stop date and times. A status of the instance (e.g., still running, and marked as a lightly shaded circle 708) indicates the instance has not completed at the location, and a status of completed or not running (e.g., a stop date and time, and marked as a dark circle 710) indicates the instance has ended. As shown in FIG. 7, Instance2 for App1 has ended for the Austin site 712 and has migrated to the Atlanta site 714. This may be caused by various factors, such as lack of capacity at one site, a system downtime, or scheduling requirement, to name a few.

As the control logic provides valuable service activity data to the client system, the performance validation processes enable a consumer, e.g., client system 404, to identify activities that may be conducted outside of the boundaries of the service agreement. In an embodiment, once the control logic provides the geographic location information to the client system (as described in step 608), the client system may be provided with an option to accept or reject the activity (e.g., where the activity specifies an application instance 1 will be run at the Austin site). In this manner, the performance validation processes may request approval of the client system (on a case by case basis) before running an instance of an application at a data center not agreed upon in the service agreement.

In addition, as the control logic provides valuable service activity data to the client system, the performance validation processes enable a consumer, e.g., client system 404, to identify any non-conformances, e.g., where the activities are currently being conducted are outside the bounds of the service agreement. For example, if an application is required to run at a single selected data center, and it is determined from the service activity data that there are instances running at a different data center, this information is provided to the client system via a user interface, along with an option to contact the performance validation processes to alert and correct the non-conformance.

Figure 8:
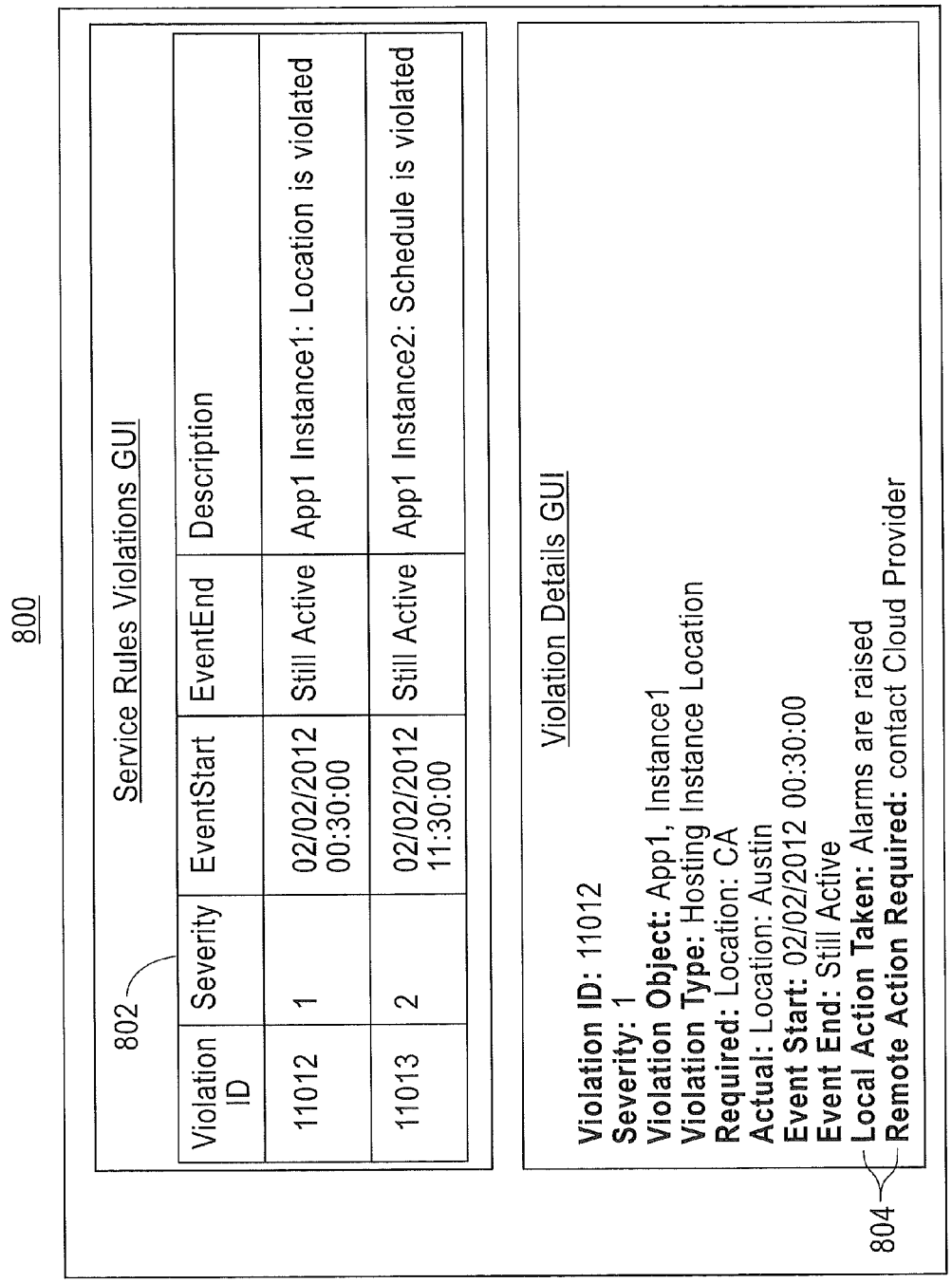
FIG. 8 depicts a user interface screen illustrating a view of service agreement non-conformances according to an embodiment of the present invention.

As shown in FIG. 8, a user interface 800 illustrating service activities and associated non-conformances is provided. As shown in FIG. 8, the non-conformances may be defined by a severity value (column 802) in which different actions 804 may be taken based on the severity level. What constitutes a severity value may be defined by the user of the client system, e.g., via the application agent 414. For example, a violation of the network-hosted computing schedule may be defined as a level 2 (less severe) violation, while a violation of a network-hosted computing site location may be defined as a level 1 (severe) violation. In an embodiment, a level 1 violation may trigger an automatic alarm to the client system 404, which may then take action such as contacting the service provider 402.

Figure 9:
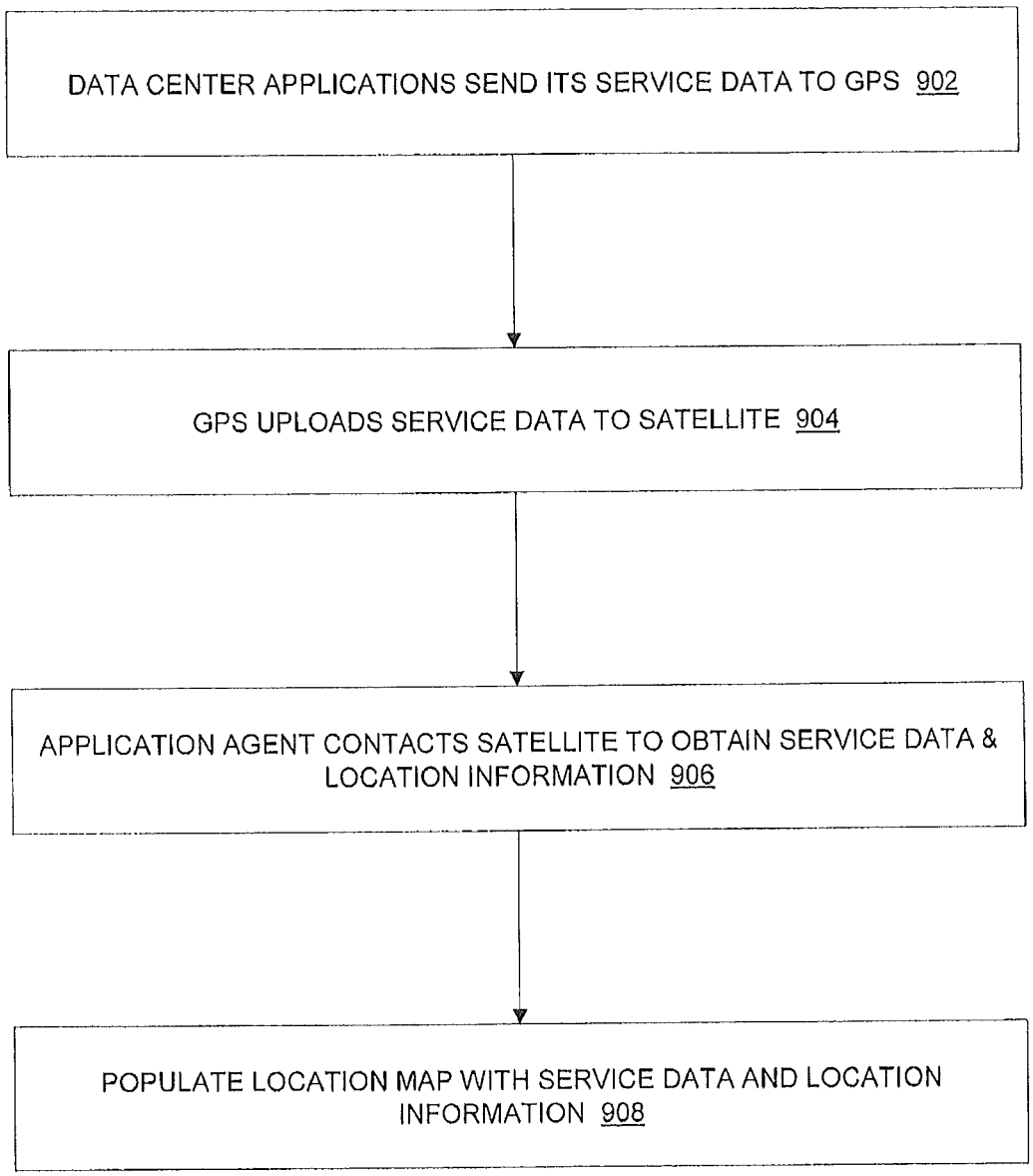
FIG. 9 is a flow diagram of a process for implementing service agreement performance validation for network-hosted services according another embodiment of the present invention.

As indicated above, the performance validation processes may determine geographic location information according to an alternative embodiment. Turning now to FIG. 9, a process for implementing the performance validation processes in an alternative embodiment will now be described.

Figure 10:
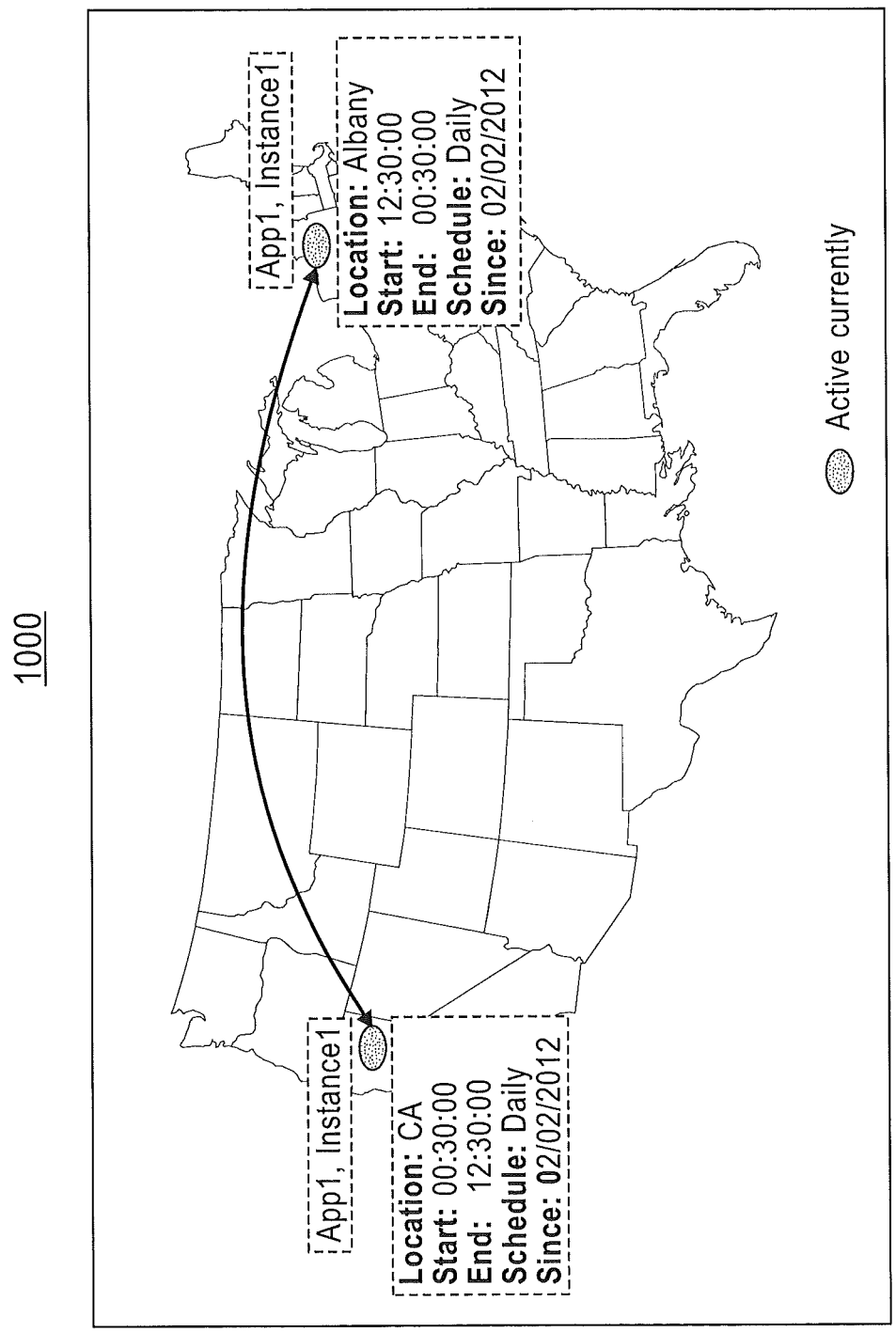
FIG. 10 is a graphical depiction of a location map according to the embodiment shown in FIG. 9.

At step 902, each of the applications at one or more associated data centers sends its service data, such as customer identification (e.g., identification of the client system/customer), application identification, and instance identification to the GPS system 504 (e.g., via the GPS receiver). The GPS 504 uploads the service data, along with its location, to the satellite 406 at step 904. The application agent 414 contacts the satellite 406 to obtain the service data and the geographic location information at step 906, and the application agent 414 populates a location map with the service data and location information at step 908. A location map 1000 providing a view of this service data and location information is shown in FIG. 10. The service data may also include schedule information and a beginning date of the schedule, as shown generally in FIG. 10.

A non-limiting, sample configuration script for implementing the performance validation processes is provided below:

```
AppInfo>
    <App Name="DBServer" AppID="1" CommType="App/Satellite" />
    <Instances NoOfInstances="2" InstanceType="Static/Dynamic"
InstanceContinuity="yes/no" />
        <Instance1>
            <HostingLocation Longitude="10" Lattitude="10"/>
            <HostingScehdule="Weekday/Daily/HourList/DayList"/>
            <HostingTiming Start=" 00:30:00 " End="00:45:00" />
            <HostingDependancy>
                <App ID="" Instance="">
                <WhatDependancy Code="1">
            </HostingDependancy>
        </Instance1>
    <Instance2>
            <HostingLocation Longitude="20" Lattitude="20">
            <HostingScehdule="Always/Weekday/Daily/HourList/DayList">
            <HostingTiming Start="00:30:00 " End="00:45:00">
            <HostingDependancy>
                <App ID="" Instance="">
                <WhatDependancy Code="2">
            </HostingDependancy>
        </Instance2>
</AppInfo>
```

In a further embodiment, the performance validation processes provide trusted information about data center performance histories. For example, each data center stores log information regarding system statuses in the form of whether a node is running or is down. The log information may be stored in storage devices 512a-512n. The log information may also include a selected node/cluster for hosting a given application instance. In an embodiment, this information may be provided to a trusted third party utility which analyzes the information to determine which cluster is hosting given an application instance and how frequently the cluster was running or experiencing downtime. This information can be provided to the customers to confirm hosting availability with regard to service agreement requirements.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

Further, as will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method, comprising:
    for each of a plurality of data centers in a network-hosted computing environment, receiving geographic location information from a global positioning system receiver associated with a corresponding data center;
    transmitting the geographic location information of at least one of the plurality of data centers to a client system on which an application is running via the network-hosted computing environment, the application running on the client system under a service level agreement between a user of the client system and a host provider of the network-hosted computing environment;
    providing the client system with an option, via an interface, to configure severity values for association with each of a plurality of non-conformance types, with respect to performance of the application at a data center,
    each of the severity values defining a separate action to be taken; and
    transmitting service data corresponding to the performance of the application to the client system;
    wherein the actions include migrating the currently-running application to a different data center based on an identification of one of the configured severity values with respect to the service data, the different data center selected based on the geographic location information.

2. The method of claim 1, further comprising:
    providing a geographic map for the client system; and
    populating the geographic map with the geographic address of the data centers and corresponding service data associated with service activities specific to the client system only, the service data including an application identification and an application instance identification.

3. The method of claim 2, wherein the service data includes application instance start date and time and application instance stop date and time.

4. The method of claim 2, wherein the service data includes application status including active and inactive.

5. The method of claim 2, wherein the service data includes application instance migration information.

6. The method of claim 1, further comprising:
    providing, to the client system, a view of any application instances specific to the client system that are non-conformant with terms of the service level agreement.

7. The method of claim 1, further comprising:
    providing an option to the client system, along with the geographic location information of the different data center, to accept or reject the different data center with respect to migrating the application in response to a non-conformance.

8. The method of claim 1, further comprising:
    providing, to the client system, a view of a schedule of applications and application instances and corresponding geographic locations of data centers; and providing an option to the client system to accept or reject at least one of the data centers with respect to the schedule in response to a non-conformance.

9. The method of claim 1, wherein geographic location information is received from a global positioning system that is communicatively coupled to a global positioning system satellite.

10. The method of claim 1, wherein the network-hosted computing environment is a cloud computing network.

11. The method of claim 1 wherein service level agreement specifies that the application is to run on at a single data center selected by the user, and one of the non-conformance types indicates the application is being run at multiple data centers or at a data center not specified in the service level agreement.

12. The method of claim 1, wherein the service level agreement specifies that the application run within a schedule specified by the user, and one of the non-conformance types indicates the application is being run at a time that is outside of the specified schedule.

13. A computer program product comprising a non-transitory computer-readable storage medium having instructions embodied thereon, which when executed by a computer, causes the computer to implement a method, the method comprising:
for each of a plurality of data centers in a network-hosted computing environment, receiving geographic location information from a global positioning system receiver associated with a corresponding data center;
transmitting the geographic location information of at least one of the plurality of data centers to a client system on which an application is running via the network-hosted computing environment, the application running on the client system under a service level agreement between a user of the client system and a host provider of the network-hosted computing environment;
providing the client system with an option, via an interface, to configure severity values for association with each of a plurality of non-conformance types, with respect to performance of the application at a data center,
each of the severity values defining a separate action to be taken; and
transmitting service data corresponding to the performance of the application to the client system;
wherein the actions include migrating the currently-running application to a different data center based on an identification of one of the configured severity values with respect to the service data, the different data center selected based on the geographic location information.

14. The computer program product of claim 13, further comprising instructions for implementing:
providing a geographic map for the client system; and
populating the geographic map with the geographic address of the data centers and corresponding service data associated with service activities specific to the client system only, the service data including an application identification and at least one of:
an application instance identification;
application instance start date and time;
application instance stop date and time;
application status including active and inactive; and
application instance migration information.

15. The computer program product of claim 13, further comprising instructions for implementing:
providing, to the client system, a view of any application instances specific to the client system that are non-conformant with terms of the service level agreement.

16. The computer program product of claim 13, further comprising instructions for implementing:
providing an option to the client system, along with the geographic location information of the different data center, to accept or reject the different data center with respect to migrating the application in response to a non-conformance.

* * * * *